March 8, 1927.
B. MAYER
ELECTRIC COOKING DEVICE
Filed July 21, 1926
1,620,602
4 Sheets-Sheet 1
Fig.1.
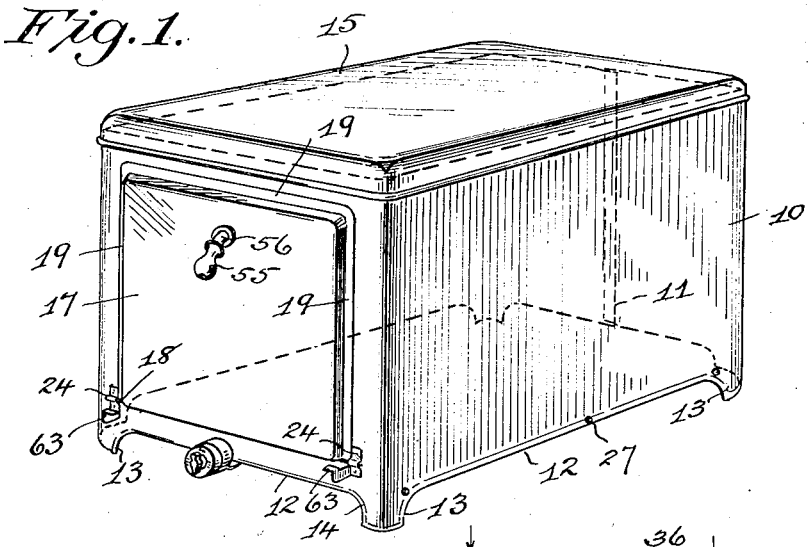
Fig.2.
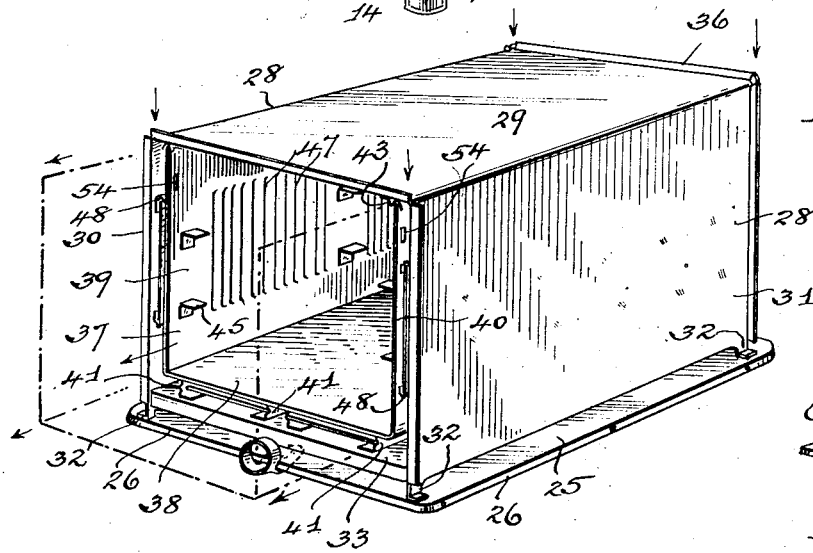
Fig.7.
Fig.3.
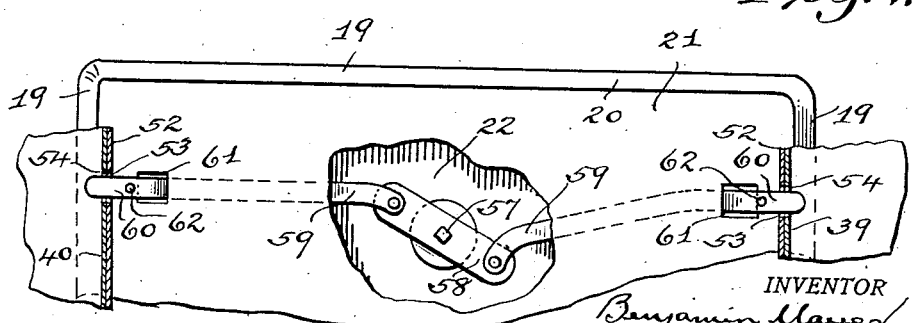
INVENTOR
Benjamin Mayer
BY Charles B. Mann
ATTORNEY March 8, 1927.

B. MAYER 1,620,602

ELECTRIC COOKING DEVICE

Filed July 21, 1926

Inventor
Benjamin Mayer
By Charles B. Mann Jr.
Attorney

Patented Mar. 8, 1927.

1,620,602

UNITED STATES PATENT OFFICE.

BENJAMIN MAYER, OF BALTIMORE, MARYLAND, ASSIGNOR TO THE PRONTO MANUFACTURING COMPANY, OF BALTIMORE, MARYLAND, A CORPORATION OF MARYLAND.

ELECTRIC COOKING DEVICE.

Application filed July 21, 1926. Serial No. 123,877.

My invention relates to improvements in electric cooking devices and has among its objects to provide a cooking device of very simple and comparatively cheap construction; which shall include a novel arrangement of interior shells enclosed by an outer shell or casing, and wherein the inner shells shall be free of contact with the outer shell, thereby providing an air space at the sides, top, bottom and rear of the inner shells to better retain the heat and prevent overheating of the outer shell or casing, and whereby the inner shells are so carried within the outer casing that they may be removed to permit access to the several heating units for purposes of repairs.

A further object of the invention is to provide a novel arrangement of side and bottom heating units between the inner shells but so disposed as to permit access thereto.

With these, and other objects in view, the invention is illustrated in the accompanying drawings, wherein,—

Fig. 1 shows the complete cooking device in perspective.

Fig. 2 illustrates the entire interior shell units in perspective as though withdrawn from the bottom of the outer casing.

Fig. 3 shows an inner face view of the door with portions of the wall broken away to show the latch device and also shows a fragment of the slotted inner shell which the latch-bars engage.

Fig. 7 shows the combined hinge-bracket and stop in perspective.

Figure 4:
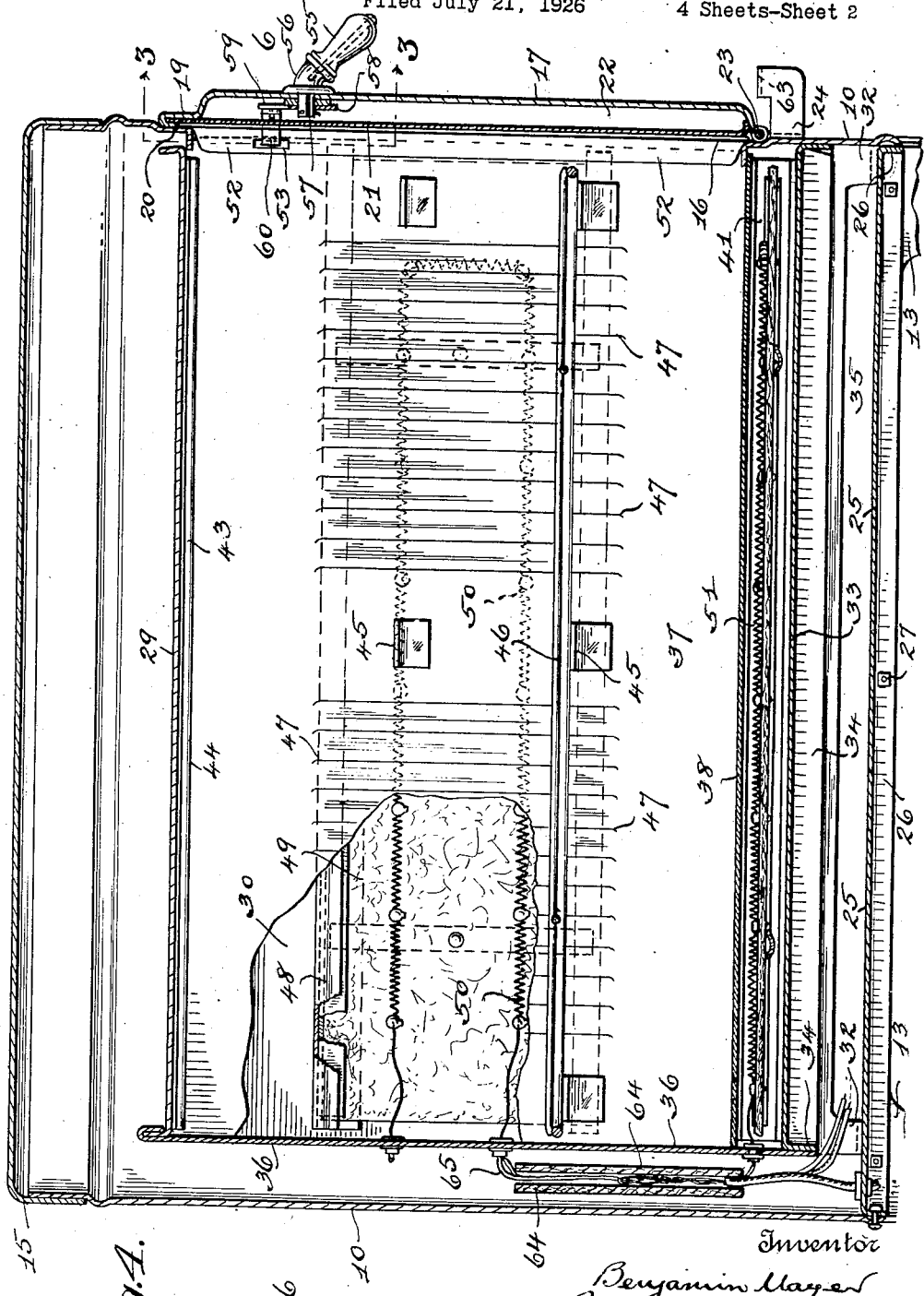
Fig. 4 illustrates an enlarged longitudinal sectional detail through the entire cooking device,—a portion of the inner shell wall being broken away to show one of the side heating units.

Referring to the drawings, the numeral 10, designates an outer rectangular sheet-metal body formed from a single sheet of metal with a single vertical seam 11 at the rear thereof.

At the lower edge, the metal of this body is cut away as at 12, on all four sides, between the corners 13, whereby said corners will form four feet, upon which the cooker may rest.

A reenforcing bead 14, is formed all around the lower edge of the body 12 and the feet 13 to stiffen the same.

A flanged one-piece top 15, fits down on the body 10 and is preferably welded thereon to form a permanent cover for said body, and at the front, an opening 16, is provided in the body which opening is closed by a door 17 that is hung by trunnions 18, at its lower or bottom corners.

Figure 6:
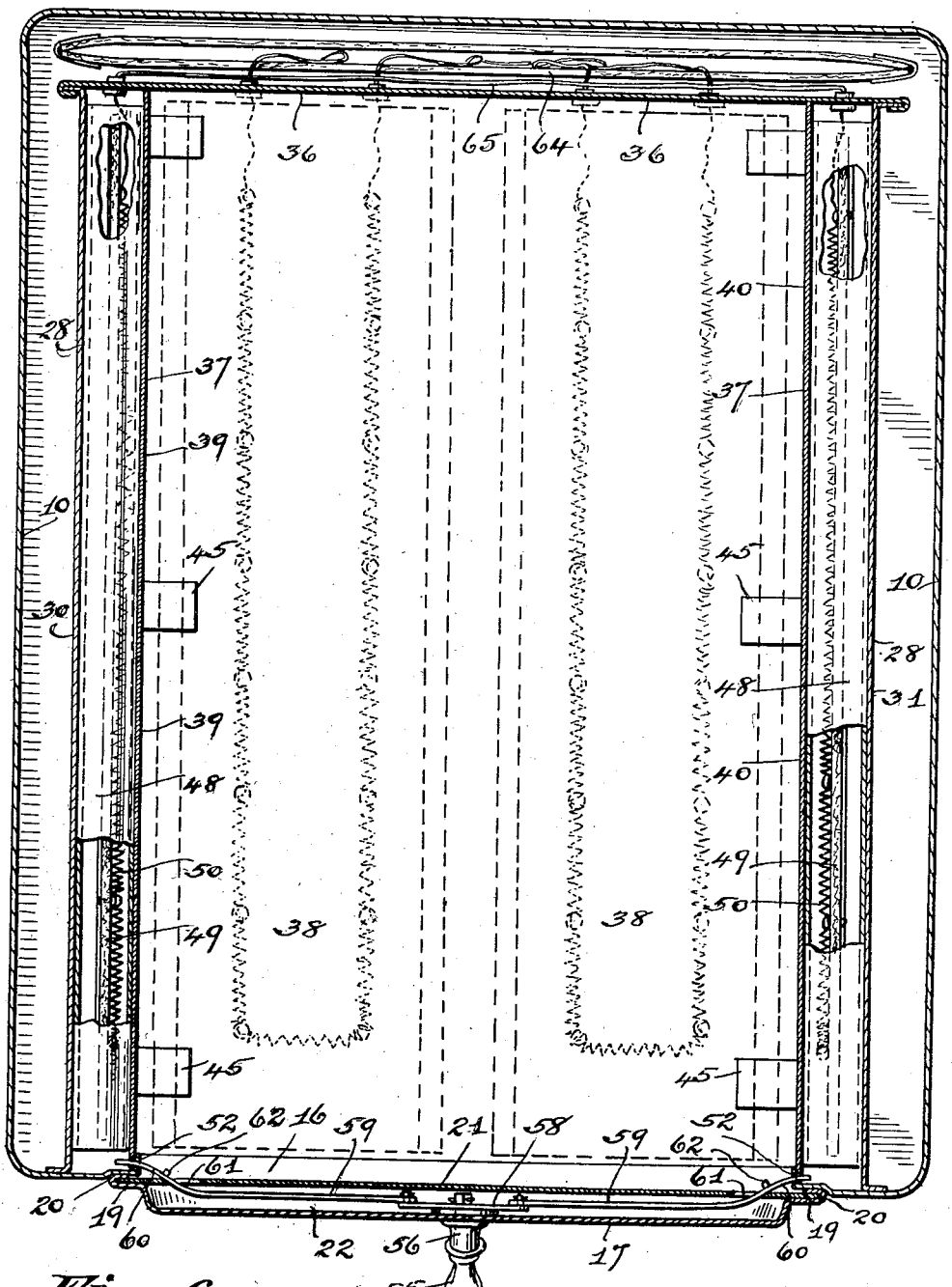
Fig. 6 illustrates a horizontal sectional detail through the entire structure,—the section being taken on the line 6—6 of Fig. 4.

As shown in Figs. 3, 4 and 6 of the drawings, the door 17, has a flat flange 19 at its top edge and also at its two vertical side edges and these flanges have a back-turned edge 20 into which fits an inside vertical door-plate 21 whereby to form an insulating chamber or space 22 in the door between the outer and inner plates thereof.

The lower edge of the door is beaded or rolled so that a reinforcing wire 23 may extend therethrough and the ends of this wire are engaged by the hinge-brackets 24, which are carried on the outer front face of the body so that the door is carried in the trunnions 18.

A flat bottom plate 25 is fitted up into the shell and this plate has a down-turned flange 26 which seats against the inner sides of the four walls of the body and detachable fastenings 27, extend through said body walls and also through said flanges 26 whereby to retain the bottom in place.

On the inside of and next to the outer body 10, I provide an intermediate shell 28, which is of substantially an inverted U-shape in that it is formed with a flat top 29 and vertical sides 30—31.

Each side wall 30—31 of this intermediate shell is provided with corner lugs 32 at its bottom edge, which lugs turn outwardly and seat on the upper side of the flat bottom plate 25 and are preferably welded thereto. This construction sustains the intermediate shell in an elevated position from the bottom plate 25.

A false bottom 33 fits up between the side walls of the intermediate shell and said false bottom has down-turned side flanges 34, which are welded to the side walls 30—31 and thus hold the false bottom 33 in an elevated position whereby to provide a dead air space or chamber 35 between the two bottoms 25 and 33.

At the rear, the intermediate shell 28 is closed by an end plate or rear wall 36 as shown in Figs. 2–4–5 and 6 of the drawings.

It will be seen that quite a dead air-space is formed between the top, bottom, two sides and one end of the intermediate shell and the outer body or shell 10, so that no surface of the intermediate shell is exposed to outside temperatures.

In the intermediate shell 28, I locate an inner cooking shell 37, and this latter shell is also of a U-shape having a horizontal bottom 38 and two vertical sides 39 and 40 formed integrally from a single metal plate.

The bottom 38 of the inner cooking shell is supported in an elevated position above the false bottom 33, by means of two sets of spaced guide-bars 41, each of which has a guide groove 42 extending in a fore and aft direction with respect to the front and back of the shell.

The guide-bars 41 are permanently secured to the false bottom by welding or by fastenings.

The side walls 39—40 of the cooking shell have their upper edges engaged in longitudinal channels 43 of guide and spacer bars 44, that are attached to the top 29 of the intermediate shell so that said side walls of the cooking shell are held against lateral movement in either direction and are also held spaced from the side walls 30—31 of said intermediate shell.

The rear end of the cooking shell is closed by the same end plate or rear wall 36 that closes the rear end of the intermediate shell.

Each side wall 39—40 of the cooking shell has inturned flanges or brackets 45 thereon to form a support for a horizontal grid or shelf 46 in the cooking shell, and each of said walls also has a series of vertical slots 47 for the inlet of heat from the space formed between said walls and the side walls 30—31 of the intermediate shell.

Figure 5:
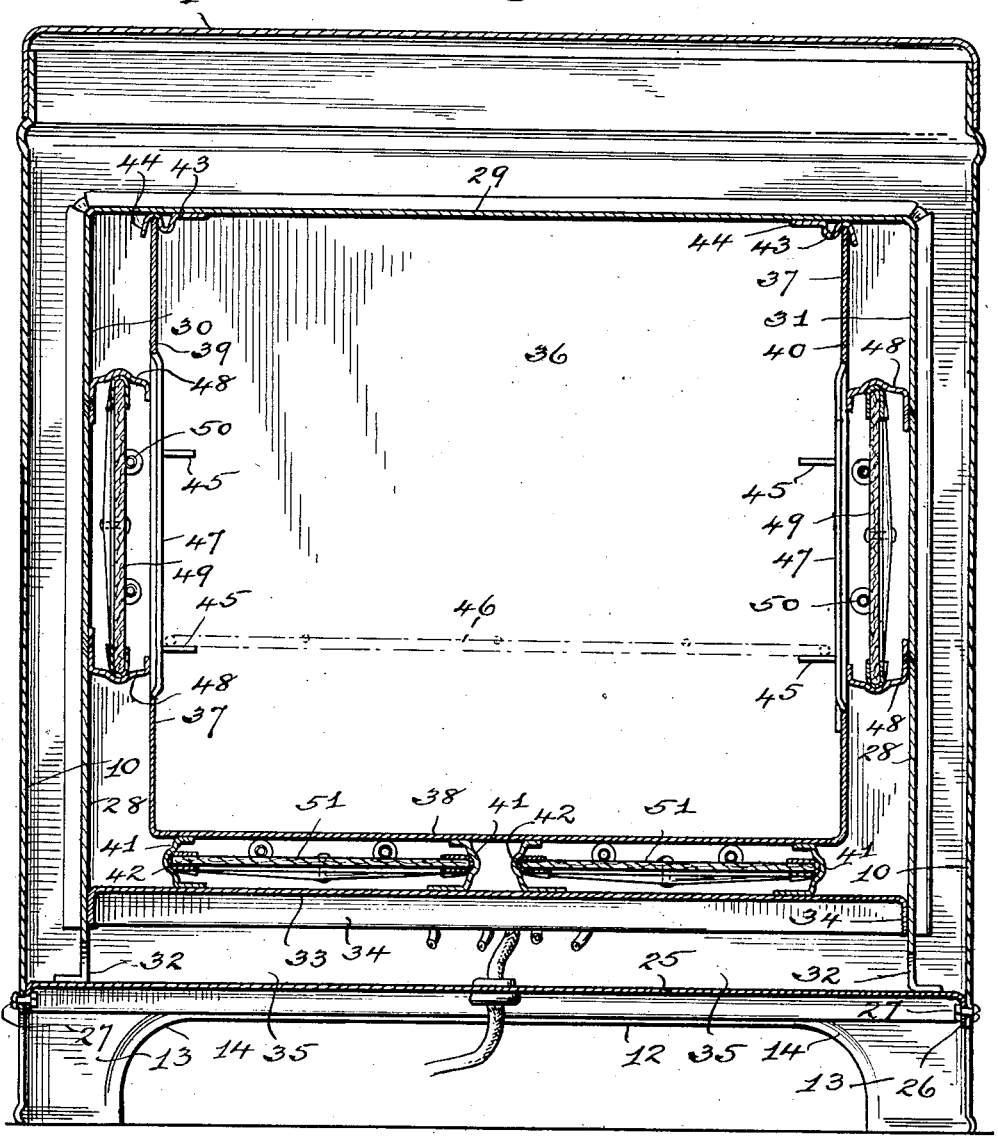
Fig. 5 shows a cross-sectional detail through the entire structure.

In the space between the cooking shell walls 39—40 and the intermediate shell walls 30—31, I provide spaced-apart horizontal guide-bars 48 and these guide bars not only maintain the space between said walls but sustain heating units 49 of any suitable form,—the wires 50 of which are indicated in Figs. 4, 5 and 6 of the drawings.

Similar heating units 51 are provided in the space between the bottom 38 of the cooking shell and the false bottom 33,—the heating units all having a sliding engagement with the guide-bars 44 or 48 as the case may be.

By reference to Figs. 2–3–4 and 6 of the drawings, it will be noted that the outer body 10 has inturned vertical flanges 52 at the door-opening and that these flanges turn inwardly and seat against the inner faces of the side walls 39—40 of the cooking shell.

These inturned-flanges 52 are provided with vertical slots 53 while similar slots 54 are formed in the said side walls 39—40 of the cooking shell.

The door 17 carries a latching device consisting of a knob 55 carried on the outer end of a shank 56 which latter extends through the outer plate of the door and in the insulating space 22 of the door the latch shank has a squared stem 57 which carries a bar 58. To the opposite ends of this bar 58, I connect the inner ends of two oppositely-extending latch-bars 59 and the outer ends 60 of these bars extend rearwardly through slots 61 in the inner door plate 21 and are guided by these slots to the engaging slots 53—54 in the flanges 52 and the shell walls 39—40 as clearly seen in Figs. 3 and 6 of the drawings.

The bending of the latch ends 60 serves to draw the door flanges 19 close against the outer side of the body-shell when the knob 55 is swung and the latch-bars are extended, thereby effectually sealing the joint about the door when the latter is closed and fastened.

Stop-pins 62 on the latch-bar ends serve to prevent said bars from being retracted until their ends are drawn into the slots 61.

The bracket bearings 24 on the front of the body 10 have stop-lugs 63 on which the door may reset when it is swung down in the open position.

An insulating covering 64 is provided for the wires 65 at the rear of the cooker to protect the latter.

In practice the heating units are so wired that the side units 49 may be operated; the bottom units 51 may be operated or all units operated so that various temperatures may be attained.

The entire structure is so designed that in case of needed repairs, the fastenings 27 at the bottom 25, may be removed and said bottom with the entire wiring and inner shells may be dropped from the outer body whereupon any of the heating units may be withdrawn from the front of the removed shells.

Having described my invention, I claim—

1. In an electric cooking device the combination with an outer body having a detachable bottom, an inner intermediate shell spaced from the sides, top and rear walls of and within the said outer body, said intermediate shell also being spaced from the detachable bottom except at its corners, an inner shell fitting within the said intermediate shell and being spaced from the side and bottom walls of the latter, heating units in the side spaces between the inner and intermediate shells, a switch socket attached to the detachable bottom and a heating unit in the space between the intermediate and the inner shells.

2. In an electric cooking device the combination with an outer body, an intermediate shell and an inner cooking shell, with a detachable bottom in the outer body, a raised false bottom in the intermediate shell, and the bottom of the cooking-shell being elevated from the said false bottom by spaced guide-bars, a heating unit in the space between said cooking-shell bottom and the false bottom of the intermediate shell, said heating unit being engaged by said guide-bars and heating units in the spaces formed between the sides of the cooking-shell and the sides of the intermediate shell.

3. In an electric cooking device the combination with an outer body having an opening at one end, a door for closing said opening, an inverted U-shaped intermediate shell having a top and sides, a bottom fitting up into the intermediate shell between the lower ends of its side walls, guide-bars seated on said bottom of the intermediate shell and in spaced relation, a U-shaped cooking shell having its bottom seated on the guide-bar and its side walls extending to the top of the intermediate shell, said side walls of the cooking-shell having longitudinal side openings, heating units at each side of the cooking-shell between the walls thereof and the walls of the intermediate shell and a heating unit beneath the bottom of the cooking-shell and held by said guide-bars.

In testimony whereof I affix my signature.

BENJAMIN MAYER.